United States Patent
Kim (10) Patent No.: US 12,334,681 B2
(45) Date of Patent: Jun. 17, 2025

(54) CHARGING GUN DISCONNECTING APPARATUS

(71) Applicant: HYUNDAI MOBIS CO., LTD., Seoul (KR)

(72) Inventor: Jang Ho Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 331 days.

(21) Appl. No.: 18/089,755

(22) Filed: Dec. 28, 2022

(65) Prior Publication Data
US 2024/0178617 A1    May 30, 2024

(30) Foreign Application Priority Data
Nov. 30, 2022    (KR) .................. 10-2022-0163617

(51) Int. Cl.
*B60L 53/16*    (2019.01)
*H01R 13/635*    (2006.01)
*H01R 13/627*    (2006.01)

(52) U.S. Cl.
CPC ............ *H01R 13/635* (2013.01); *B60L 53/16* (2019.02); *H01R 13/6272* (2013.01); *H01R 2201/26* (2013.01)

(58) Field of Classification Search
CPC .............. H01R 13/635; H01R 13/6272; H01R 2201/26; B60L 53/16
See application file for complete search history.

(56) References Cited

U.S. PATENT DOCUMENTS

| | | | | |
|---|---|---|---|---|
| 4,140,359 A | * | 2/1979 | Kunz | H01R 13/633 439/160 |
| 4,314,735 A | * | 2/1982 | Fullenkamp | H01R 13/633 248/346.11 |
| 7,431,601 B2 | * | 10/2008 | Nugent, Jr. | H01R 13/7132 439/181 |
| 8,932,072 B2 | * | 1/2015 | Tamaki | B62J 43/16 439/345 |
| 9,106,015 B2 | * | 8/2015 | Ohmura | H01R 13/6275 |
| 9,225,109 B2 | * | 12/2015 | Sasaki | B60L 53/16 |
| 9,263,830 B2 | * | 2/2016 | Sugiyama | B60L 53/16 |
| 9,365,116 B2 | * | 6/2016 | Staley | H02J 7/0042 |
| 9,509,095 B2 | * | 11/2016 | Ohmura | B60L 53/16 |
| 9,620,897 B2 | * | 4/2017 | Takagi | H01R 13/639 |
| 9,685,734 B1 | * | 6/2017 | Nugent, Jr. | B60L 53/16 |
| 9,755,359 B2 | * | 9/2017 | Moseke | H01R 13/6275 |

(Continued)

OTHER PUBLICATIONS

Extended European search report issued on Sep. 15, 2023, in counterpart European Patent Application No. 22216558.1 (9 pages).

*Primary Examiner* — Thanh Tam T Le
(74) *Attorney, Agent, or Firm* — NSIP Law (57) ABSTRACT

A charging gun disconnecting apparatus including a housing disposed on a panel of a vehicle and coupled to a charging gun and a pushing unit disposed inside the vehicle and disposed inside the housing. The pushing unit includes a holder coupled to a hook of the charging gun and configured to move and to protrude to the outside of the panel of the vehicle and an ejector that protrudes to the outside of the panel together with the holder, the holder being movably disposed inside the holder to release a coupling between the charging gun and the housing while moving to the outside of the holder in a same direction in which the holder moves.

14 Claims, 10 Drawing Sheets

(56) References Cited

U.S. PATENT DOCUMENTS

| | | | |
|---|---|---|---|
| 9,812,820 B2* | 11/2017 | Takagi | B60L 53/16 |
| 10,232,720 B1* | 3/2019 | Kinomura | B60L 53/16 |
| 10,348,038 B2* | 7/2019 | Ognjanovski | H01R 13/6397 |
| 10,630,029 B2* | 4/2020 | Beimdieck | B60L 53/16 |
| 10,938,159 B2* | 3/2021 | Chagny | B60L 53/16 |
| 11,745,607 B2* | 9/2023 | Führer | H01R 13/701 |
| | | | 439/352 |
| 11,787,299 B2* | 10/2023 | Vega | H01R 13/639 |
| | | | 439/160 |
| 2011/0254377 A1* | 10/2011 | Wildmer | B60L 53/122 |
| | | | 307/104 |
| 2012/0108097 A1* | 5/2012 | Takagi | H01R 13/6275 |
| | | | 439/345 |
| 2013/0012054 A1* | 1/2013 | Andresen | H01R 24/28 |
| | | | 439/476.1 |
| 2016/0144728 A1* | 5/2016 | Harper | B60L 53/67 |
| | | | 320/109 |
| 2017/0077650 A1* | 3/2017 | Chang | G06K 19/07737 |
| 2018/0201145 A1* | 7/2018 | Yellambalase | B60L 53/60 |
| 2022/0016988 A1* | 1/2022 | Führer | H01R 13/701 |
| 2022/0297554 A1* | 9/2022 | Garcia-Ferre | B60L 53/18 |
| 2022/0355690 A1* | 11/2022 | Linsmeier | B60K 6/40 |

* cited by examiner

CHARGING GUN DISCONNECTING APPARATUS

CROSS-REFERENCE TO RELATED APPLICATION

This application claims the benefit under 35 USC § 119(a) of Korean Patent Application No. 10-2022-0163617, filed on Nov. 30, 2022, the disclosure of which is incorporated herein by reference for all purposes.

BACKGROUND

1. Field

The present disclosure relates to a charging gun disconnecting apparatus for disconnecting a charging gun coupled to a vehicle from the vehicle.

2. Description of the Related Art

An electric vehicle is a type of vehicle operated using electricity as a power source. Since the electric vehicle receives power through a battery, the battery capacity is maintained by charging the battery instead of refueling.

In order to charge electric vehicles, a battery is charged by inserting a charging gun similar to a shape of a fuel gun into a charging port of the vehicle. The charging gun used to charge the battery may include a gun body provided for the user to hold, a pin-type gun head protruding from the gun body and coupled to the charging port, and a hook disposed on the gun body and disposed above the gun head to fix the charging gun to the charging port.

However, the conventional charging gun requires a user to directly fix and disconnect the hook to and from the charging port, and in particular, there occurs a problem that the hook and a panel of the vehicle collide or the user and the panel of the vehicle collide by an excessive force used in a process of disconnecting the hook from the charging port, resulting in damage to the user, the hook of the charging gun, or the panel of the vehicle.

In addition, since the user needs to directly disconnect the hook from the charging port, the overall time required for the charging operation increases, which may lead to a reduction in the convenience of use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a charging gun disconnecting apparatus including a housing disposed on a panel of a vehicle and coupled to a charging gun, and a pushing unit disposed inside the vehicle and disposed inside the housing. The pushing unit including a holder coupled to a hook of the charging gun, the holder being configured to move and protrude to an outside of the panel of the vehicle, and an ejector that protrudes to the outside of the panel together with the holder, the ejector being movably disposed inside the holder to release a coupling between the charging gun and the housing while moving to an outside of the holder in a same direction in which the holder moves.

When the ejector protrudes to the outside of the holder, a coupled state between the hook of the charging gun and the holder may be released.

The housing may include an accommodating hole formed in the housing and configured to accommodate a gun head of the charging gun and a fixing part disposed inside the accommodating hole and coupled to the gun head of the charging gun. The holder and the ejector may be configured to protrude to the outside of the panel of the vehicle by passing through the accommodating hole.

The charging gun disconnecting apparatus may also include a link connected to the ejector, the link being configured to press the ejector and an actuator connected to the link, the actuator being configured to generate power to rotate the link. The ejector may be pressed by the link when the link is rotated by the actuator and moved in a first direction from an inside to the outside of the panel of the vehicle.

The holder may include a main body including a first guide hole and a second guide hole formed therein to movably accommodate the ejector and a stopper that protrudes from the main body in a second direction from the first guide hole toward the second guide hole, the stopper being configured to come into contact with the housing when the main body is moved.

The ejector may include a first moving body disposed in the first guide hole of the holder, a second moving body disposed in the second guide hole of the holder, and a protrusion that protrudes from the second moving body in the second direction from the first guide hole toward the second guide hole of the holder, wherein the protrusion is configured to be connected to the link, pressed by the link when the link is rotated by the actuator, and moved along the link.

An end of the second moving body of the ejector may be configured to have a shape inclined in a third direction from the second moving body toward the first moving body.

The charging gun disconnecting apparatus may also include a hinge block, the hinge block including a contact part disposed in the first guide hole of the holder and a rotational part configured to protrude from the contact part and to be rotatably coupled to the main body.

The charging gun disconnecting apparatus may also include a side block disposed adjacent to a surface of the holder on which the hinge block is disposed and the holder can include an exposure hole formed in the main body to expose a portion of the hinge block to the outside of the holder.

The holder may be moved by a pressing of the link between a first position where the side block covers the exposure hole and a second position where the exposure hole is positioned out of a coverage of the side block.

The contact part of the hinge block includes a first surface configured to come into contact with the first moving body of the ejector in a state in which the link does not press the protrusion of the ejector and a second surface configured to come into contact with the side block when the ejector moves in a fourth direction from the inside toward the outside of the panel of the vehicle.

The first surface of the contact part of the hinge block may be configured to be pressed by the first moving body of the ejector and be rotated about the rotational part of the hinge block in a first process in which the holder is moved from the first position to the second position.

The charging gun disconnecting apparatus may also include a holder cover configured to cover one side of each of the first guide hole and the second guide hole of the holder to prevent a separation of the ejector in a second process in which the holder is moved from the second position to the first position.

The holder and the ejector may be simultaneously moved in a first section outside the housing and a distance of the first section may correspond to a movement distance of the stopper.

The ejector may be moved in a second section outside the holder after the stopper comes into contact with the housing and the movement of the holder stops and a distance of the second section may correspond to a vertical distance from a position of an end of the link when the stopper comes into contact with the housing to a position where the end of the link comes into contact with the stopper and to where the movement of the holder is stopped.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other components(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
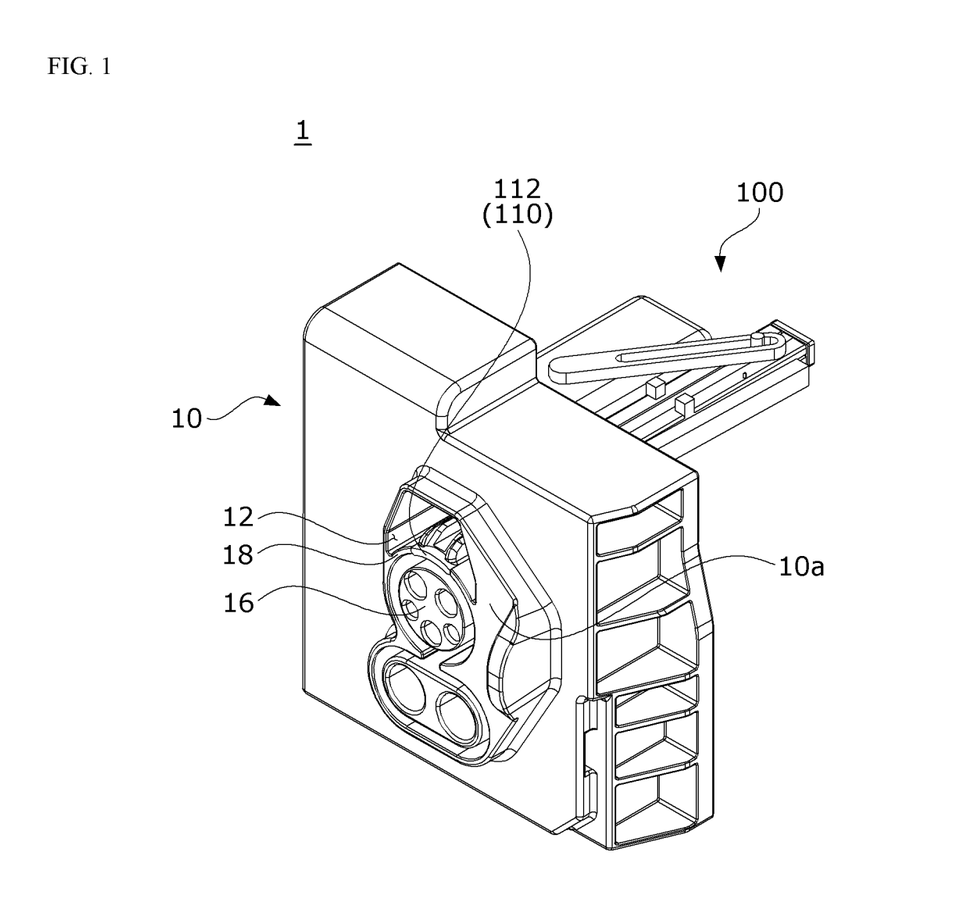
FIG. 1 is a perspective view of a charging gun disconnecting apparatus according to one embodiment of the present disclosure.
Figure 2:
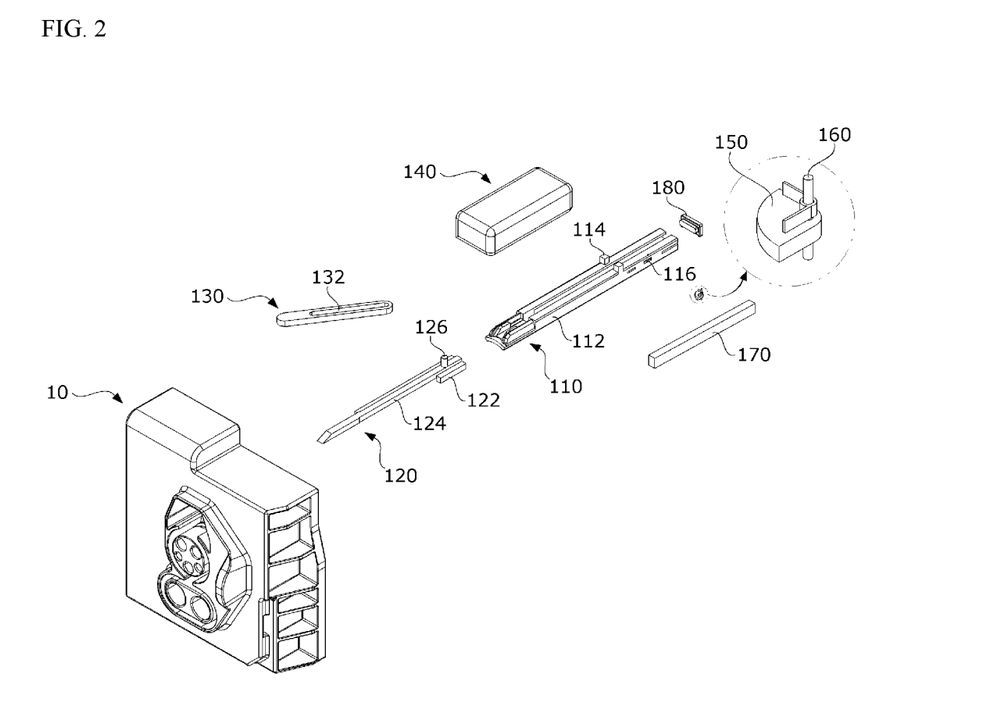
FIG. 2 is an exploded perspective view of the charging gun disconnecting apparatus according to one embodiment of the present disclosure.
Figure 3:
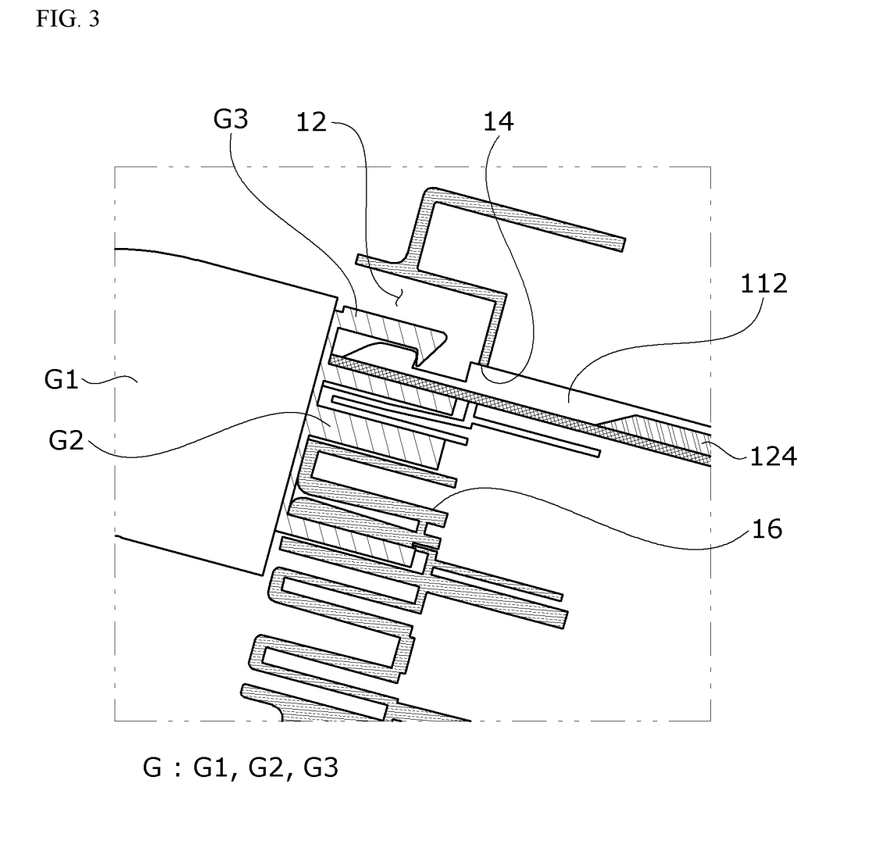
FIG. 3 is a view showing a state in which a charging gun is coupled to the charging gun disconnecting apparatus.
Figure 4:
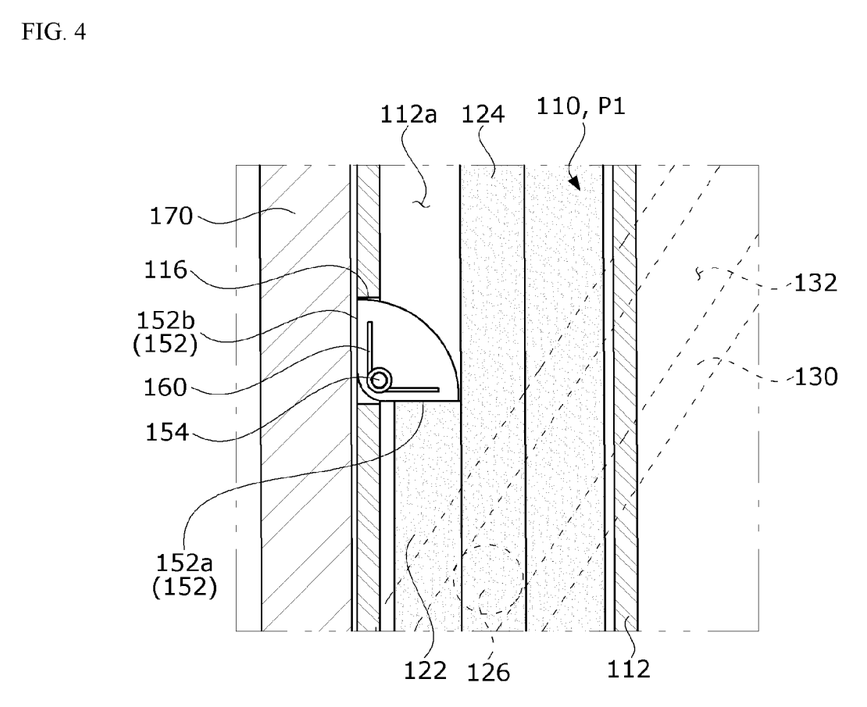
FIG. 4 is a view showing a state in which a first surface of a hinge block is in contact with an ejector.
Figure 5:
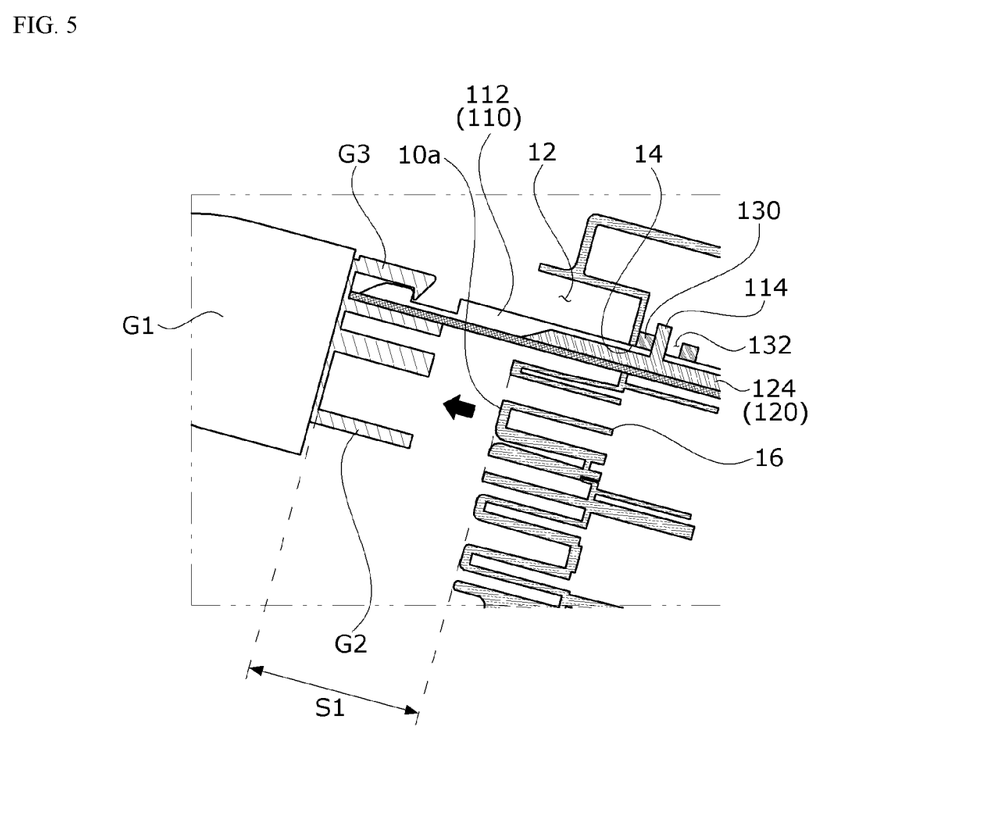
FIG. 5 is a view showing a state in which a holder and the ejector advance from a housing.
Figure 6:
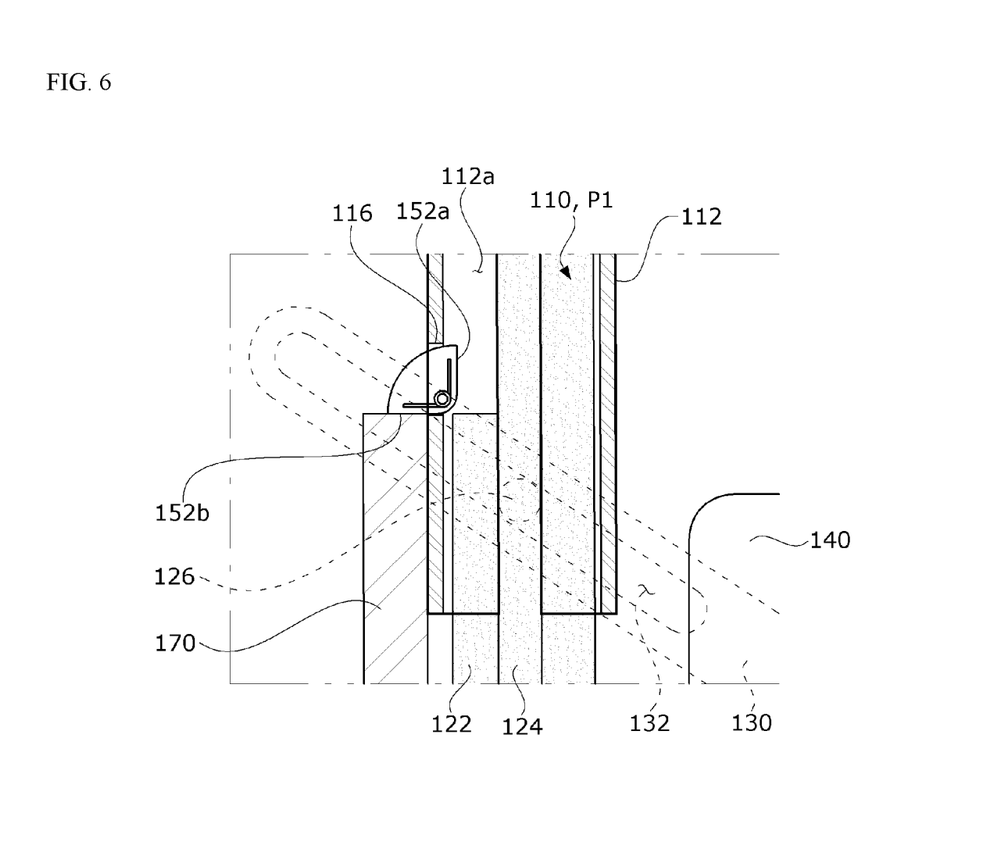
FIG. 6 is a view showing a state in which a link is rotated and a second surface of the hinge block is in contact with a side block.
Figure 7:
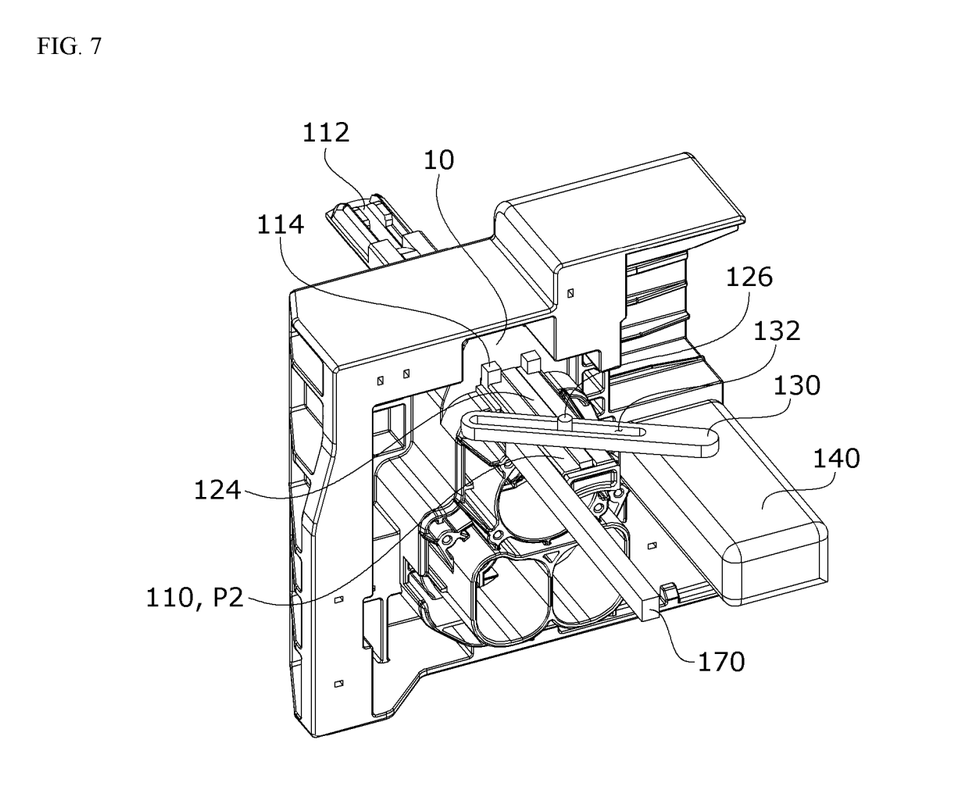
FIG. 7 is a view showing a state in which a stopper of the holder is in contact with the housing.
Figure 8:
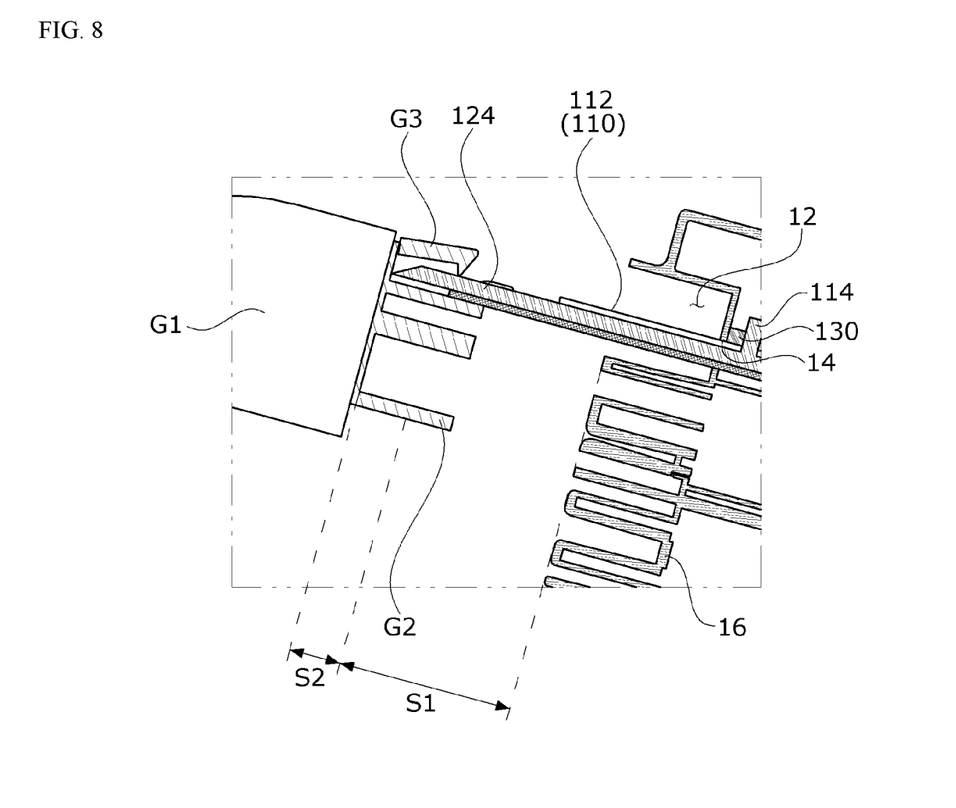
FIG. 8 is a view showing a state in which the ejector lifts the hook of the charging gun.
Figure 9:
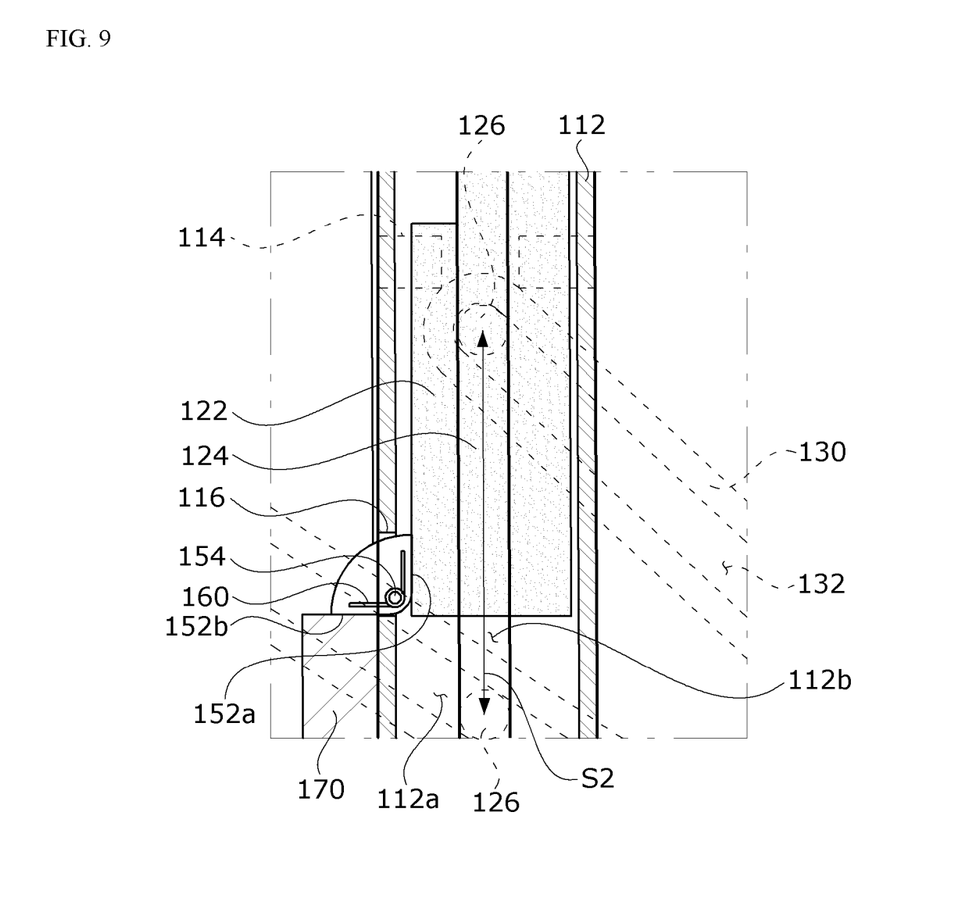
FIG. 9 is a view showing a state in which the ejector advances in a state in which the second surface of the hinge block is in contact with the side block.
Figure 10:
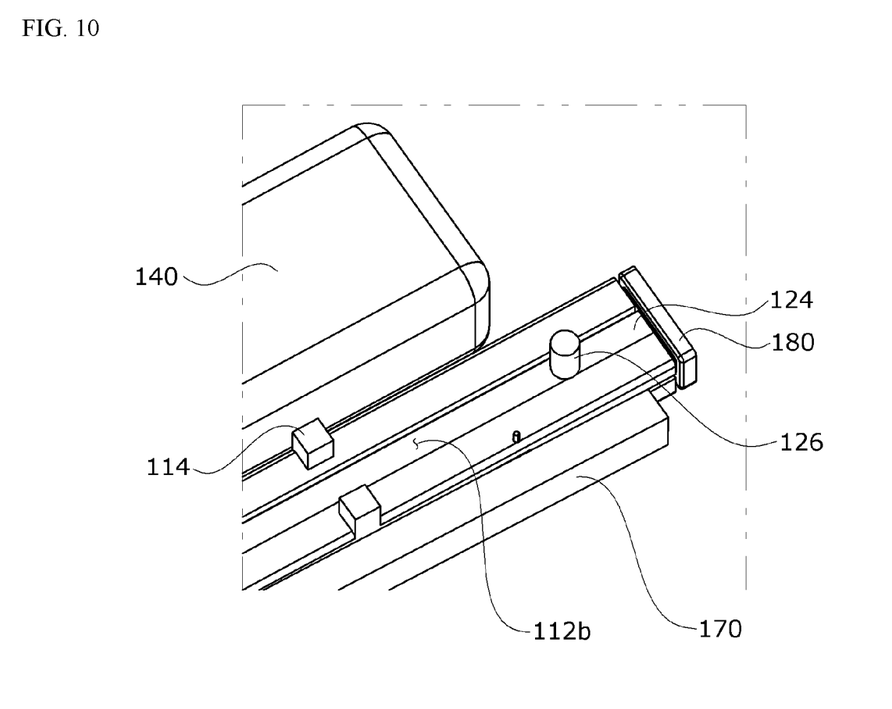
FIG. 10 is a view showing a state in which the ejector is in contact with a holder cover.

FIG. 1 is a perspective view of a charging gun disconnecting apparatus according to one embodiment of the present disclosure, FIG. 2 is an exploded perspective view of the charging gun disconnecting apparatus according to one embodiment of the present disclosure, FIG. 3 is a view showing a state in which a charging gun is coupled to the charging gun disconnecting apparatus, FIG. 4 is a view showing a state in which a first surface of a hinge block is in contact with an ejector, FIG. 5 is a view showing a state in which a holder and the ejector advance from a housing, FIG. 6 is a view showing a state in which a link is rotated and a second surface of the hinge block is in contact with a side block, FIG. 7 is a view showing a state in which a stopper of the holder is in contact with the housing, FIG. 8 is a view showing a state in which the ejector lifts the hook of the charging gun, FIG. 9 is a view showing a state in which the ejector advances in a state in which the second surface of the hinge block is in contact with the side block, and FIG. 10 is a view showing a state in which the ejector is in contact with a holder cover.

Referring to FIGS. 1 to 3, a charging gun disconnecting apparatus 1 according to one embodiment of the present disclosure includes a housing 10 disposed on a panel (not shown) of a vehicle and coupled to a charging gun G and a pushing unit 100 disposed inside the vehicle and disposed inside the housing 10.

First, as shown in FIG. 3, the charging gun G may include a gun body G1 formed to be gripped by a user, a gun head G2 protruding from the gun body G1 and coupled to the housing 10, and a hook G3 disposed above the gun head G2 and connected to the pushing unit 100 to fix the charging gun G to the housing 10.

The housing 10 may be coupled to the charging gun G to fix the charging gun G. The housing 10 may include a first accommodating hole 12, a second accommodating hole 14, a fixing part 16, and a guide protrusion 18.

The first accommodating hole 12 is formed in the housing to accommodate the gun head G2 of the charging gun G. More specifically, the first accommodating hole 12 may be formed in a central portion of the housing 10.

The second accommodating hole 14 may communicate with the first accommodating hole 12. The second accommodating hole 14 may be used as a passage through which a holder 110 of the pushing unit 100, which will be described below, moves toward the outside or inside of the housing 10.

The fixing part 16 may be disposed inside the first accommodating hole 12. The fixing part 16 may be coupled to the gun head G2 of the charging gun G accommodated in the first accommodating hole 12 to fix the gun head G2 to the housing 10.

The guide protrusion 18 may be disposed inside the first accommodating hole 12. Based on FIG. 1, the guide protrusion 18 may protrude from an inner wall surface of the first accommodating hole 12 of the housing 10 toward the inside of the first accommodating hole 12. The guide protrusion 18 may protrude upward from a central portion of the first accommodating hole 12 based on FIG. 1. The guide protrusion 18 may be disposed on one side and the other side of the first accommodating hole 12. The guide protrusion 18 may guide a moving direction of the holder 110 of the pushing unit 100 which will be described below. Therefore, the guide protrusion 18 can improve the stability of the holder 110 of the pushing unit 100.

The pushing unit 100 may include the holder 110, an ejector 120, a link 130, an actuator 140, a hinge block 150, a spring 160, a side block 170 and a cover of the holder 110.

The holder 110 may be coupled to the hook G3 of the charging gun G. One end of the holder 110 may be disposed between a plurality of guide protrusions 18 disposed on the one side and the other side of the first accommodating hole 12 of the housing 10. The other end of the holder 110 may be disposed inside the housing 10, more specifically, inside the panel of the vehicle. The holder 110 may be moved to protrude to the outside of the panel of the vehicle by the link 130.

The holder 110 may include a main body 112 and a stopper 114.

The main body 112 may form an exterior of the holder 110. The main body 112 may have a rectangular shape having a length from the inside toward the outside of the housing 10. The main body 112 may be disposed between the plurality of guide protrusions 18 of the housing 10 on one end of the housing 10. One end of the main body 112 may be coupled to the hook G3 of the charging gun G. The hook G3 of the charging gun G coupled to the one end of the main body 112 may be fixed to the main body 112.

The main body 112 may include a first guide hole 112a and a second guide hole 112b.

The first guide hole 112a may be disposed in a longitudinal direction of the main body 112. The first guide hole 112a may be formed inside the main body 112. The first guide hole 112a may movably accommodate the ejector 120. The first guide hole 112a may have a shape corresponding to an outer surface of a first moving body 122 of the ejector 120 which will be described below.

The second guide hole 112b may be disposed in the longitudinal direction of the main body 112. The second guide hole 112b may be disposed above the main body 112 based on FIG. 7. The second guide hole 112b may communicate with the first guide hole 112a. The second guide hole 112b may movably accommodate the ejector 120. The second guide hole 112b may have a shape corresponding to an outer surface of the second moving body 124 of the ejector 120 which will be described below.

The stopper 114 may be disposed on the main body 112 based on FIGS. 2 and 7. The stopper 114 may protrude from the main body 112 in a direction from the first guide hole 112a toward the second guide hole 112b. A plurality of stoppers 114 may be disposed on the main body 112, and the plurality of stoppers 114 may be disposed to be spaced apart from each other in a direction crossing a longitudinal direction of the holder 110. The stopper 114 may be in contact with the housing 10 when the main body 112 is moved in a direction from the inside toward the outside of the housing 10. When the stopper 114 comes into contact with the housing 10, the movement of the holder 110 may be stopped.

An exposure hole 116 may be formed in the main body 112 as shown in FIGS. 2, 4, 6, and 9. More specifically, the exposure hole 116 may be disposed in a side portion facing the side block 170 among side portions of the main body 112. The exposure hole 116 may be covered by the side block 170 disposed adjacent to the holder 110. The exposure hole 116 may communicate with the first guide hole 112a. A portion of the hinge block 150 rotated by a pressing force generated by the ejector 120 may pass through the exposure hole 116. A second surface 152b of the hinge block 150 passing through the exposure hole 116, which will be described below, may be exposed to the outside of the holder 110. A second moving body 124 of the ejector 120 whose movement path is blocked by the hinge block 150 may pass the hinge block 150 and further move in a direction from the inside toward the outside of the housing 10 inside the first guide hole 112a.

As shown in FIGS. 4 and 9, a length of the exposure hole 116 may be greater than or equal to a rotation radius of a rotational part 154 of the hinge block 150. Therefore, the exposure hole 116 does not interfere with the rotation of the hinge block 150. Therefore, the hinge block 150 can be stably rotated inside the exposure hole 116.

The ejector 120 together with the holder 110 may protrude to the outside of the panel of the vehicle. The ejector 120 may be movably disposed in the holder 110 and may release the coupling between the charging gun G and the housing 10 while moving to the outside of the holder 110 in a direction in which the holder 110 moves.

The ejector 120 may be pressed by the link 130 being rotated, which will be described below, and moved in a direction from the inside toward the outside of the panel of the vehicle. In addition, the holder 110 and the ejector 120 may pass through the first accommodating hole 12 of the housing 10 and protrude to the outside of the panel of the vehicle. Therefore, the charging gun G coupled to the housing 10 may be spaced apart from the housing 10. Therefore, it is possible to prevent damage to the housing 10 or the panel of the vehicle that may occur in a disconnecting process of the charging gun G.

The ejector 120 may include the first moving body 122, the second moving body 124, and a protrusion 126.

The first moving body 122 may be disposed in the first guide hole 112a of the holder 110. The first moving body 122 may be provided in a shape corresponding to the first guide hole 112a of the holder 110. The first moving body 122 may be moved inside the first guide hole 112a of the holder 110.

The second moving body 124 may be disposed in the second guide hole 112b of the holder 110. The second moving body 124 may be disposed above the first moving body 122 based on FIG. 2. The second moving body 124 may be provided in a shape protruding from a top of the first moving body 122. The second moving body 124 may be moved inside the second guide hole 112b of the holder 110.

As shown in FIGS. 2 and 8, an end of the second moving body 124 may have a shape that is inclined in a direction from the second moving body 124 toward the first moving body 122. More specifically, as shown in FIGS. 2 and 8, the end of the second moving body 124 may have a shape in which a cross-sectional area gradually decreases from top to bottom. The end of the second moving body 124 may come into contact with the hook G3 of the charging gun G to lift the hook G3. The end of the second moving body 124 may come into contact with the gun head G2 of the charging gun G to stop the movement.

The protrusion 126 may be disposed on the second moving body 124. The protrusion 126 may protrude from the second moving body 124 in a direction from the first guide hole 112a of the holder 110 toward the second guide hole 112b. The protrusion 126 may have a cylindrical shape, but the present disclosure is not limited thereto. The protrusion 126 may be connected to the link 130. The protrusion 126 may be connected to the link 130, pressed to the link 130 being rotated, and moved along the link 130. The first moving body 122 and the second moving body 124 move in a direction from the inside toward the outside of the housing 10 or in a direction from the outside toward the inside of the housing 10 by the movement of the protrusion 126.

The link 130 may be connected to the ejector 120 to press the ejector 120. In addition, the link 130 may be connected to the actuator 140 and rotated through power generated by the actuator 140.

The link 130 may include a link hole 132. The link hole 132 may be formed inside the link 130. As shown in FIG. 2, the link hole 132 may be disposed inside the link 130 in a longitudinal direction of the link 130. The link hole 132 may be connected to the protrusion 126 of the ejector 120. The protrusion 126 of the ejector 120 connected to the link hole 132 may be pressed to the link 130 rotated by the actuator 140.

The actuator 140 may be disposed on one side of the holder 110. The actuator 140 may be connected to the link 130 in a state of being disposed on the one side of the holder 110. The actuator 140 may have a power source disposed therein and generate power. Therefore, the actuator 140 may rotate the link 130.

The hinge block 150 may be disposed in the first guide hole 112a of the holder 110. The hinge block 150 may be pressed and rotated by the ejector 120 moving in conjunction with the movement of the link 130. The hinge block 150 may include a contact part 152 and the rotational part 154.

The contact part 152 may be disposed in the first guide hole 112a of the holder 110. The contact part 152 may be formed to have a fan-shaped cross section. The contact part 152 may be rotated by the movement of the ejector 120. The contact part 152 may include a first surface 152a and the second surface 152b.

The first surface 152a may be disposed in the first guide hole 112a of the holder 110. The first surface 152a is in contact with the first moving body 122 of the ejector 120 in a state in which the link 130 does not press the protrusion 126 of the ejector 120.

The second surface 152b may be disposed to perpendicularly cross the first surface 152a. The second surface 152b is covered by the side block 170 in a state in which the side block 170 covers the exposure hole 116. In addition, the second surface 152b may be exposed to the outside of the holder 110 through the exposure hole 116 when the holder 110 moves and the exposure hole 116 is positioned out of the side block 170. The second surface 152b may come into contact with the side block 170 when the ejector 120 moves in a direction from the inside toward the outside of the panel of the vehicle.

The rotational part 154 may be disposed on a surface other than the first surface 152a and the second surface 152b in the contact part 152. The rotational part 154 may protrude from the contact part 152 from the first guide hole 112a of the holder 110 toward the second guide hole 112b. As shown in FIGS. 4 and 9, the rotational part 154 may be rotatably coupled to the main body 112 of the holder 110. When the first surface 152a of the contact part 152 is pressed by the first moving body 122 of the ejector 120, the hinge block 150 may be rotated about the rotational part 154.

The spring 160 may be coupled to the rotational part 154 of the hinge block 150. The spring 160 may include a torsion spring. Therefore, the spring 160 may have a shape extending toward each of the first surface 152a and the second surface 152b of the contact part 152 of the hinge block 150 while coupled to the rotational part 154 of the hinge block 150.

When the state in which the first surface 152a of the contact part 152 of the hinge block 150 rotated by the advancement of the ejector 120 faces the first moving body 122 of the ejector 120 is released, the spring 160 may assist rotation of the hinge block 150 to return the hinge block 150 to a state prior to rotation.

The side block 170 may be disposed on a side portion of the holder 110. More specifically, the side block 170 may be disposed adjacent to a surface of the main body 112 of the holder 110 on which the hinge block 150 and the exposure hole 116 are disposed. The side block 170 may be provided in a shape having a length in the longitudinal direction of the main body 112 of the holder 110.

The side block 170 may cover the exposure hole 116 of the holder 110 in a state in which the first surface 152a of the contact part 152 of the hinge block 150 is in contact with the first moving body 122 of the ejector 120 and open the exposure hole 116 of the holder 110 in a state in which the first surface 152a of the contact part 152 of the hinge block 150 is in contact with the first moving body 122 of the ejector 120.

The holder 110 cover may be coupled to the main body 112 of the holder 110. The holder 110 cover may be disposed on the other end opposite to an end of a side where the ejector 120 protrudes from the main body 112 of the holder 110. The holder 110 cover may cover one side of each of the first guide hole 112a and the second guide hole 112b of the holder 110 to prevent the separation of the ejector 120 in a process in which the holder 110 is moved from a second position P2 to a first position P1, which will be described below.

Hereinafter, a phenomenon caused by arranging the holder 110 at the first position P1 and the second position P2 will be described.

First, in a state in which the hook G3 of the charging gun G is fixed to the main body 112 of the holder 110 and accommodated in the first accommodating hole 12 of the housing 10, one end of the main body 112 of the holder 110 together with the hook G3 of the charging gun G is accommodated in the first accommodating hole 12 of the housing 10.

In this state, the main body 112 of the holder 110 may be disposed at the first position P1 where the side block 170 covers the exposure hole 116. When the main body 112 of the holder 110 is disposed at the first position P1, as shown in FIG. 4, the first surface 152a of the hinge block 150 may be in contact with the first moving body 122 of the ejector 120 to limit the movement of the first moving body 122.

In addition, the ejector 120 may be moved so that the ejector 120 of the main body 112 of the holder 110 is disposed at the second position P2 where the exposure hole 116 of the holder 110 is positioned out of a coverage of the side block 170. When the main body 112 of the holder 110 is disposed at the second position P2, as shown in FIG. 9, the contact part 152 of the hinge block 150 is rotated about the rotational part 154, and the second surface 152b of the contact part 152 of the hinge block 150 may be in contact with the side block 170.

As described above, the main body 112 of the holder 110 disposed at the first position P1 and the second position P2 may be moved by pressing the link 130. More specifically, in the state where the main body 112 of the holder 110 is disposed at the first position P1, when the link 130 is rotated clockwise by the power generated by the actuator 140, the protrusion 126 of the ejector 120 connected to the link hole 132 of the link 130 may be pressed by the link 130. At this time, since a posture of the second surface 152b of the hinge block 150 is fixed by the side block 170, the hinge block 150 may hold the ejector 120 to the holder 110 so that the ejector 120 does not move. Therefore, the main body 112 of the holder 110 may be moved along with the ejector 120 in a direction from the inside toward the outside of the housing 10.

Conversely, in the state where the main body 112 of the holder 110 is disposed at the second position P2, the link 130 may be rotated counterclockwise by the power generated by the actuator 140. The protrusion 126 of the ejector 120 may be pressed by the link 130 according to the counterclockwise rotation of the link 130. At this time, the hinge block 150 is in a state of being rotated so that the second surface 152b is in contact with the side block 170. Therefore, the protrusion 126 of the ejector 120 may be moved in a direction from the outside toward the inside of the housing 10 through the second accommodating hole 14, and the main body 112 of the holder 110 may be moved toward the first position P1 along with the ejector 120 in a direction from the outside toward the inside of the housing 10.

As described above, the main body 112 of the holder 110 may be moved between the first position P1 and the second position P2 in conjunction with the movement of the ejector 120 moved by the pressure of the link 130. In other words, the holder 110 may not move by itself and may move only when the ejector 120 linked with the link 130 moves. Therefore, it is possible to prevent a phenomenon in which the holder 110 is moved by shaking due to an external force and the charging gun G is disconnected from the housing 10.

In addition, as described above, the first surface 152a of the contact part 152 of the hinge block 150 may be pressed by the first moving body 122 of the ejector 120 in a process in which the holder 110 is moved from the first position P1 to the second position P2 and rotated about the rotational part 154 of the hinge block 150. Therefore, as shown in FIG. 9, the hinge block 150 does not interfere with the moving path of the ejector 120 and, at the same time, may come into contact with the first moving body 122 of the ejector 120 to guide the moving direction of the first moving body 122. Therefore, the hinge block 150 may assist the stable movement of the ejector 120.

Hereinafter, a process of disconnecting the hook G3 of the charging gun G from the holder 110 will be described.

Referring to FIGS. 3 to 9, when the ejector 120 protrudes to the outside of the holder 110, a coupled state between the hook G3 of the charging gun G and the holder 110 may be released.

First, the hook G3 of the charging gun G is in a state of being accommodated in the first accommodating hole 12 of the housing 10. In addition, as shown in FIG. 3, one end of the main body 112 of the holder 110 is disposed collinear with an exposed surface 10a of the housing 10 in a state of being disposed inside the first accommodating hole 12 after passing through the second accommodating hole 14.

In this state, the holder 110 and the ejector 120 may be moved simultaneously in a first section S1 outside the housing 10. More specifically, when the link 130 is rotated in a first direction (clockwise) by the operation of the actuator 140, the protrusion 126 of the ejector 120 may be moved by a pressing force of the link 130 in a direction from the inside toward the outside of the housing 10.

At this time, as shown in FIG. 4, the first moving body 122 of the ejector 120 and the first surface 152a of the contact part 152 of the hinge block 150 are in contact with each other, and the second surface 152b of the contact part 152 of the hinge block 150 is fixed to the holder 110 in a state of being accommodated in the exposure hole 116 by the side block 170.

As described above, since the hinge block 150 is fixed to the holder 110 and is not rotated, when the ejector 120 is moved, the holder 110 coupled to the hinge block 150 may be pressed by the hinge block 150 and moved in the same direction as the direction in which the ejector 120 moves. Therefore, as shown in FIG. 5, the holder 110 and the ejector 120 may be simultaneously moved in the first section S1 outside the housing 10.

Here, a distance of the first section S1 may correspond to a movement distance of the stopper 114 of the holder 110. In addition, the distance of the first section S1 may correspond to a movement distance of each of the holder 110 and the ejector 120 from the exposed surface 10a of the housing 10. In other words, the main body 112 of the holder 110 and the ejector 120 are moved as much as a movement distance of each of the stopper 114 of the holder 110 and comes into contact with the housing 10.

When one end of the main body 112 of the holder 110 is moved from a start point to an end point of the first section S1, as shown in FIG. 5, the charging gun G may be spaced apart from the housing 10 while coupled to the main body 112 of the holder 110. At this time, the end of the second moving body 124 of the ejector 120 may be disposed in a central region of the first section S1.

When the one end of the main body 112 of the holder 110 reaches the end point of the first section S1, as shown in FIG. 6, the exposure hole 116 and the hinge block 150 are positioned out of the coverage of the side block 170. Therefore, the exposure hole 116 and the hinge block 150 may be exposed to the outside of the main body 112 of the holder 110. At this time, the holder 110 moved by the ejector 120 is stopped by the stopper 114 in contact with the housing 10 as shown in FIG. 7.

Next, when the link 130 is continuously rotated by the operation of the actuator 140 in a state in which the one end of the main body 112 of the holder 110 reaches the end point of the first section S1 (state in which the holder 110 is stopped by the stopper 114 in contact with the housing 10), the contact part 152 of the hinge block 150 is rotated about the rotational part 154 as the first moving body 122 of the ejector 120 is moved.

Therefore, as shown in FIG. 6, the second surface 152b of the contact part 152 of the hinge block 150 comes into contact with the side block 170. Therefore, the first surface 152a of the contact part 152 of the hinge block 150 is released from a state in which one region of the first guide hole 112a of the holder 110 is closed. At this time, the ejector 120 is in a state of continuously moving in a direction from the inside toward the outside of the housing 10 by the pressing force generated by the link 130.

When the stopper 114 comes into contact with the housing 10 and the movement of the main body 112 of the holder 110 stops, the ejector 120 is positioned out of the first section S1 and may be moved in the second section S2 outside the holder 110.

Here, a distance of the second section S2 may correspond to a vertical distance from a position of the end of the link 130 when the stopper 114 of the holder 110 is in contact with the housing to a position where the end of the link 130 is in contact with the movement of the stopper 114 and the holder 110 stops.

When the second moving body 124 of the ejector 120 reaches an end point of the second section S2, as shown in FIG. 8, the end of the main body 112 of the holder 110 and one surface of the gun head G2 of the charging gun G may be spaced apart from each other.

In the process in which the second moving body 124 of the ejector 120 is moved to the end point of the second section S2, as shown in FIG. 8, the end of the second moving body 124 of the ejector 120 is in contact with the hook G3 of the charging gun G to lift the hook G3. Therefore, the coupled state between the main body 112 of the holder 110 and the hook G3 of the charging gun G is released.

When the user separates the charging gun G from the second moving body 124 of the ejector 120 in the state in which the second moving body 124 of the ejector 120 reaches the end point of the second section S2 and the coupled state between the main body 112 of the holder 110 and the hook G3 of the charging gun G is released, the charging gun G may be completely disconnected from the pushing unit 100.

Through a reverse process, the ejector 120 may be disposed inside the holder 110, and the pushing unit 100 may return to an initial state of not protruding from the exposed surface 10a of the housing 10.

According to one embodiment of the present disclosure, the charging gun G may be automatically separated from the housing 10 of the charging gun disconnecting apparatus 1 or the panel of the vehicle through the linked movement of each component of the pushing unit 100. Therefore, it is possible to prevent the collision between the charging gun G and the housing 10 or between the charging gun G and the panel of the vehicle that may occur when the user manually disconnects the charging gun G through the charging gun disconnecting apparatus 1, thereby preventing damage to the vehicle.

In addition, according to one embodiment of the present disclosure, the charging gun G may be automatically released from the housing 10 of the charging gun disconnecting apparatus 1 or the panel of the vehicle through the linked movement of each component of the pushing unit 100. Therefore, it is possible to improve the user's convenience because the process in which the user directly disconnects the hook G3 of the charging gun G from the housing 10 is omitted.

According to one embodiment of the present disclosure, it is possible to prevent a collision between a charging gun and a housing or between the charging gun and a panel of a vehicle, which may occur when a user manually disconnects the charging gun. Therefore, it is possible to prevent damage to the vehicle and prevent a phenomenon in which a user is injured.

In addition, according to one embodiment of the present disclosure, the charging gun can be automatically disconnected from the housing of a charging gun disconnecting apparatus or the panel of the vehicle. Therefore, a procedure for the user to directly disconnect a hook of the charging gun from the housing can be omitted, thereby improving the user's convenience.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A charging gun disconnecting apparatus, comprising:
    a housing disposed on a panel of a vehicle and configured to be coupled to a charging gun; and
    a pushing unit disposed inside the vehicle and disposed inside the housing,
    wherein the pushing unit comprises:
        a holder configured to be coupled to a hook of the charging gun, the holder being configured to move and protrude to an outside of the panel of the vehicle;
        an ejector that protrudes to the outside of the panel together with the holder, the ejector being configured to be movably disposed inside the holder to release a coupling between the charging gun and the housing while moving to an outside of the holder in a same direction in which the holder moves;
        a link connected to the ejector and configured to press the ejector; and
        an actuator connected to the link and configured to generate power to rotate the link,
        wherein the ejector is pressed by the link when the link is rotated by the actuator and moved in a first direction from an inside to the outside of the panel of the vehicle.

2. The charging gun disconnecting apparatus of claim 1, wherein, when the ejector protrudes to the outside of the holder, a coupled state between the hook of the charging gun and the holder is released.

3. The charging gun disconnecting apparatus of claim 1, wherein the housing comprises:
    an accommodating hole formed in the housing and configured to accommodate a gun head of the charging gun; and
    a fixing part disposed inside the accommodating hole and coupled to the gun head of the charging gun,
    wherein the holder and the ejector are configured to protrude to the outside of the panel of the vehicle by passing through the accommodating hole.

4. The charging gun disconnecting apparatus of claim 1, wherein the holder comprises:
    a main body including a first guide hole and a second guide hole formed therein to movably accommodate the ejector; and
    a stopper that protrudes from the main body in a second direction from the first guide hole toward the second guide hole, the stopper being configured to come into contact with the housing when the main body is moved.

5. The charging gun disconnecting apparatus of claim 4, wherein the ejector comprises:
    a first moving body disposed in the first guide hole of the holder;
    a second moving body disposed in the second guide hole of the holder; and
    a protrusion that protrudes from the second moving body in the second direction from the first guide hole toward the second guide hole of the holder,
    wherein the protrusion is configured to be:
    connected to the link;
    pressed by the link when the link is rotated by the actuator; and
    moved along the link.

6. The charging gun disconnecting apparatus of claim 5, wherein an end of the second moving body of the ejector is configured to have a shape inclined in a third direction from the second moving body toward the first moving body.

7. The charging gun disconnecting apparatus of claim 5, further comprising a hinge block, the hinge block comprising:
    a contact part disposed in the first guide hole of the holder; and
    a rotational part configured to protrude from the contact part and to be rotatably coupled to the main body.

8. The charging gun disconnecting apparatus of claim 7, further comprising:
    a side block disposed adjacent to a surface of the holder on which the hinge block is disposed,
    wherein the holder includes an exposure hole formed in the main body to expose a portion of the hinge block to the outside of the holder.

9. The charging gun disconnecting apparatus of claim 8, wherein the holder is moved by a pressing of the link between a first position where the side block covers the exposure hole and a second position where the exposure hole is positioned out of a coverage of the side block.

10. The charging gun disconnecting apparatus of claim 9, wherein the contact part of the hinge block comprises:
    a first surface configured to come into contact with the first moving body of the ejector in a state in which the link does not press the protrusion of the ejector; and
    a second surface configured to come into contact with the side block when the ejector moves in a fourth direction from the inside toward the outside of the panel of the vehicle.

11. The charging gun disconnecting apparatus of claim 10, wherein the first surface of the contact part of the hinge block is configured to be pressed by the first moving body of the ejector and be rotated about the rotational part of the hinge block in a first process in which the holder is moved from the first position to the second position.

12. The charging gun disconnecting apparatus of claim 9, further comprising:
    a holder cover configured to cover one side of each of the first guide hole and the second guide hole of the holder to prevent a separation of the ejector in a second process in which the holder is moved from the second position to the first position.

13. The charging gun disconnecting apparatus of claim 4, wherein the holder and the ejector are simultaneously moved in a first section outside the housing, and
    wherein a distance of the first section corresponds to a movement distance of the stopper.

14. The charging gun disconnecting apparatus of claim 13, wherein the ejector is moved in a second section outside the holder after the stopper comes into contact with the housing and the movement of the holder stops, and
    wherein a distance of the second section corresponds to a vertical distance from a position of an end of the link when the stopper comes into contact with the housing to a position where the end of the link comes into contact with the stopper and to where the movement of the holder is stopped.

* * * * *